Patented Aug. 16, 1949

2,478,959

UNITED STATES PATENT OFFICE 2,478,959

MANUFACTURE OF CARBOXY-POLYANTHRIMIDES

Richard S. Wilder, Roslyn, Pa., assignor to Allied Chemical & Dye Corporation, New York, N. Y., a corporation of New York No Drawing. Application December 24, 1946, Serial No. 718,276

10 Claims. (Cl. 260—368)

This invention relates to the manufacture of carboxy-polyanthrimides (i. e. polyanthrimides having a carboxyl group as a nuclear substituent of at least one of the anthraquinone radicals) and more particularly to improvements in the process of manufacturing carboxy-polyanthrimides by condensation of at least one amino-anthraquinone with at least one halogeno-anthraquinone, at least one of said anthraquinones having a carboxyl group as a nuclear substituent. It relates especially to improvements in the process of manufacturing 2-carboxyl-1,2'-dianthrimide (2-carboxy-1,2'-dianthraquinonylamine) by condensing 1-chloro-2-carboxy-anthraquinone with 2-amino-anthraquinone.

It is known to manufacture polyanthrimides by the condensation of at least one amino-anthraquinone (containing one or more amino groups) with at least one halogeno-anthraquinone (containing one or more halogen atoms). The condensation has generally been carried out under alkaline conditions; for example, by heating in admixture with an acid-binding agent (e. g. anhydrous sodium acetate, sodium carbonate, copper carbonate, etc.) with or without a copper catalyst (e. g. copper, cuprous chloride, copper oxide, copper carbonate, etc.) and, generally, with a neutral organic solvent or diluent (e. g. nitrobenzene, naphthalene, etc.).

When said process is applied to halogeno- or amino-anthraquinones having a carboxyl group as a nuclear substituent, low yields of carboxy-polyanthrimide are obtained. In German Patent 268,219 the low yields are attributed to decarboxylation through loss of carbon dioxide during the course of the process.

An object of the present invention is to provide an improved process for the manufacture of carboxy-polyanthrimides.

A further object of the present invention is to provide improvements in the process of manufacturing carboxy-polythrimides by condensing amino-anthraquinones with halogeno-anthraquinones, at least one of said intermediates also being a carboxy-anthraquinone, whereby increased yields of carboxy-polyanthrimides are obtained.

Additional objects of the present invention are to provide improvements in the process of condensing 1-chloro-2-carboxy-anthraquinone with an amino-anthraquinone, and to provide improvements in the process of condensing 1-amino-2-carboxy-anthraquinone with a chloro-anthraquinone, whereby increased yields of 2-carboxy-dianthrimides are obtained.

Other objects of the invention will in part be obvious and will in part appear hereinafter.

According to the present invention, the condensation of one or more amino-anthraquinones with one or more halogeno-anthraquinones, of which anthraquinones at least one contains a carboxyl group as a nuclear substituent, is carried out in the presence of a metal halide condensing agent of the Friedel and Crafts type, and especially aluminum chloride.

I have discovered that metal halide condensing agents of the Friedel and Crafts type, and especially aluminum chloride, are effective condensing agents for the production of carboxy-polyanthrimides from amino-anthraquinones and halogeno-anthraquinones, of which anthraquinones at least one contains a carboxyl group as a nuclear substituent. This result is surprising for several reasons: it was heretofore believed that an acid-binding agent was essential to effect the condensation; and, according to German Patent 529,484 and United States Patent 1,917,-801, anthraquinone-anils are formed when aromatic amines are reacted with anthraquinones (including chloro-anthraquinones) in the presence of aluminum chloride and related metal halides.

I have further discovered that considerably higher yields of carboxy-polyanthrimide can be obtained in accordance with the present invention than are obtained by the use of acid-binding condensing agents.

Preferably, the reaction is carried out by heating a mixture of the amino-anthraquinone, halogeno-anthraquinone, and metal halide condensing agent at an elevated temperature. After completion of the condensation, the resulting carboxy-polyanthrimide is freed from the metal halide condensing agent (as by treatment with aqueous acid or alkali), and is preferably recovered in the form of the free carboxy-polyanthrimide.

The reaction mixture may be heated in various ways; for example, a mixture of the amino-anthraquinone, the halogeno-anthraquinone, and the metal halide condensing agent in a substantially anhydrous condition may be heated in a substantially inert liquid organic reaction medium (i. e., a high-boiling hydrocarbon or halogenated hydrocarbon, which is liquid under the reaction conditions—such as, naphthalene, dichlorobenzene or trichlorobenzene—or another solvent or diluent of the type heretofore employed in carrying out the condensation with the aid of an acid-binding agent—such as nitrobenzene); or the anhydrous reaction mixture may be heated in a suitable reactor (for example, a rotary furnace or ball-mill type reactor) in the absence of an added solvent or diluent.

The invention will be illustrated by the following specific examples in which parts are by weight and temperatures are in degrees centigrade.

Example 1

38.5 parts of 1-chloro-2-carboxy-anthraquinone, 30 parts of 2-amino-anthraquinone, 10 parts of anhydrous aluminum chloride, and 280 parts of o-dichlorobenzene are agitated together in an enamelled kettle equipped with a stirrer, heating jacket and reflux condenser. The temperature is raised during 1 hour to 175° (the boiling point of the mixture). The mixture becomes thick at the start, then thins out with evolution of hydrogen chloride. Agitation is continued at 170° to 175° while refluxing, for 2 hours. The mixture is then run, while hot, into a still; 50 parts of soda ash are added; and the o-dichlorobenzene is distilled off with steam. The resulting aqueous slurry is diluted with water until the total aqueous mass occupies a volume corresponding to 3500 parts of water, heated to 85°, and filtered with the aid of Filter Cel to remove aluminum hydroxide and other insoluble matter. The residue on the filter is washed with hot water until the filtrate runs nearly colorless. The combined filtrate and wash waters are heated to 60° to 70°, and sulfuric acid is added slowly just to the point of complete precipitation of the 2-carboxy-1,2'-dianthrimide (red spot on filter paper with colorless runout). The precipitate is filtered off, washed with warm water, and dried.

Example 2

A mixture consisting of 38.5 parts of 1-chloro-2-carboxy-anthraquinone, 30 parts of 2-amino-anthraquinone, and 10 parts of anhydrous aluminum chloride suspended in 280 parts of o-dichlorobenzene is heated under reflux at 170° to 175° for 17 hours. The reaction mass is thereafter drowned in 1000 parts of water containing 25 parts of sodium carbonate. The drowned mass is subjected to steam distillation to remove o-dichlorobenzene and the residue is filtered. Concentrated hydrochloric acid is added to the filtrate until the aqueous mixture gives a colorless runout when spot-tested on white filter paper. The resultant slurry is filtered, and the filter cake of crude 2-carboxy-1,2'-dianthrimide is washed with water and then dried.

Example 3

A mixture consisting of 52 parts of 1-chloro-2-carboxy-anthraquinone, 40 parts of 2-amino-anthraquinone, and 15 parts of aluminum chloride is heated in a ball-mill reactor at 170° to 180° for 3 hours. The reaction mixture is then cooled and pulverized. The resulting powder is added to a mixture of 3000 parts of water and 50 parts of concentrated hydrochloric acid, and stirred to form a slurry. The slurry is filtered and washed acid-free. The washed filter cake is reslurried in 3800 parts of water in which 50 parts of soda ash have been dissolved. The slurry is heated to 85° and then sludge-filtered to remove insoluble material. Concentrated hydrochloric acid is slowly added to the resulting filtrate to precipitate 2-carboxy-1,2'-dianthrimide, which is separated from the mother liquor by filtration. The filter cake is washed with water, and the washed cake is dried.

It will be realized by those skilled in the art that the invention is not limited to the above specific examples and that changes can be made in the reaction conditions and reactants without departing from the scope of the invention.

Thus the proportions of components of the reaction mixture may be varied. Preferably the amino-anthraquinone is employed in amounts somewhat in excess of a molecular proportion, based on the amount of chloro-carboxy-anthraquinone employed. The amount of aluminum chloride may vary widely; for example, amounts as low as 0.12 mol and as high as 1.2 mols of aluminum chloride may be employed per mol of 1-chloro-2-carboxy-anthraquinone; 0.3 to 0.9 mol, and especially substantially 0.6 mol, being preferred. When less than 0.3 mol of aluminum chloride is employed, the yields of carboxy-dianthrimide are lowered; and when more than 0.9 mol of aluminum chloride is employed, the reaction is less easily controlled and the reaction mass becomes thick and less readily stirred, than when lesser amounts are used.

Instead of aluminum chloride, other metal halide condensing agents of the Friedel and Crafts type (such as anhydrous zinc chloride or ferric chloride) may be employed, but with less advantage than aluminum chloride.

The ortho-dichlorobenzene reaction medium can be replaced by other substantially inert organic solvents or diluents, such as, nitrobenzene, trichlorobenzene, etc.

The condensation temperature may be varied, temperatures above 140° C. but not substantially exceeding 210° C. ordinarily being employed, and temperatures of 160° to 190° C., and especially 170° to 180° C., being preferred. At temperatures below 160° C., the rate of reaction is unduly slow, and at temperatures above 190° C., the yield of carboxy-dianthrimide is somewhat reduced.

The duration of the reaction also can be varied, depending upon other conditions, such as the condensation temperature. Reaction periods as low as 2 hours and as high as 40 hours may be employed. Preferably, a heating period of 16 to 18 hours is employed for the production of increased yields of carboxy-dianthrimide.

Various halogeno-anthraquinone carboxylic acids may be condensed in the above manner with various amino-anthraquinones; and, alternatively, various amino-anthraquinone-carboxylic acids may be condensed in the above manner with various halogeno-anthraquinones. For example, by substituting 1-amino-2-carboxy-anthraquinone and 2-chloro-anthraquinone, respectively, for the 1-chloro-2-carboxy-anthraquinone and 2-amino-anthraquinone employed in the above examples, the same product (2-carboxy-1,2'-dianthrimide) may be obtained.

The following are additional halogeno-anthraquinones, amino-anthraquinones, halogeno-anthraquinone carboxylic acids, and amino-anthraquinone carboxylic acids which may be employed in the production of carboxy-polyanthrimides in accordance with the present invention;

1-chloro-anthraquinone
2-chloro-anthraquinone
1,5-dichloro-anthraquinone
1,8-dichloro-anthraquinone
2-chloro-3-carboxy-anthraquinone
2,6-dichloro-anthraquinone
1-amino-anthraquinone
1,5-diamino-anthraquinone
1,8-diamino-anthraquinone
2-amino-3-carboxy-anthroquinone
2,6-diamino-anthraquinone The invention is especially of value in the production of carboxy-polyanthrimides from beta-amino-anthraquinones (including anthraquinone-carboxylic acids having at least one amino group as a substituent in a beta-position of the anthraquinone nucleus), which ordinarily lead to low yields of carboxy-polyanthrimides.

Since changes may be made in carrying out the above process without departing from the scope of the invention, it is intended that all matter contained in the above description shall be interpreted as illustrative and not in a limiting sense, except as limited by the claims.

I claim:

1. In the process of manufacturing 2-carboxy-1,2'-dianthrimide by condensing a mono-amino-anthraquinone with a monochloro-anthraquinone, one of said anthraquinones having a single carboxyl group as a substituent in the 2-position but having no other substituent and the other anthraquinone having no other substituent, and one of said chloro and amino substituents being in the 1-position of its anthraquinone nucleus and the other being in the 2-position of its anthraquinone nucleus, the improvement which comprises carrying out the condensation at a temperature above 140° C., but not exceeding 210° C., with the aid of a metal halide condensing agent of the Friedel and Crafts type as condensing agent.

2. In the process of manufacturing 2-carboxy-1,2'-dianthrimide by condensing a mono-amino-anthraquinone with a monochloro-anthraquinone, one of said anthraquinones having a single carboxyl group as a substituent in the 2-position but having no other substituent and the other anthraquinone having no other substituent, and one of said chloro and amino substituents being in the 1-position of its anthraquinone nucleus and the other being in the 2-position of its anthraquinone nucleus, the improvement which comprises carrying out the condensation at a temperature above 140° C., but not exceeding 210° C., in a reaction mixture containing aluminum chloride as condensing agent.

3. The process of manufacturing a 2-carboxy-dianthrimide which comprises heating a reaction mixture containing 1-chloro-2-carboxy-anthraquinone, a mono-amino-anthraquinone having no other substituent, and a metal halide condensing agent of the Friedel and Crafts type as condensing agent at a condensation temperature above 140° C., but not exceeding 210° C.

4. The process of manufacturing a 2-carboxy-dianthrimide which comprises heating 1-chloro-2-carboxy-anthraquinone with a mono-amino-anthraquinone having no other substituent at a temperature above 140° C., but not exceeding 210° C., in a reaction mixture containing aluminum chloride as condensing agent.

5. The process of manufacturing 2-carboxy-1,2'-dianthrimide which comprises heating 1-chloro-2-carboxy-anthraquinone with 2-amino-anthraquinone at a temperature above 140° C., but not exceeding 210° C., in admixture with a metal halide condensing agent of the Friedel and Crafts type.

6. The process of manufacturing 2-carboxy-1,2'-dianthrimide which comprises heating 1-chloro-2-carboxy-anthraquinone with 2-amino-anthraquinone and 0.3 to 0.9 mol of aluminum chloride, per mol of 1-chloro-2-carboxy-anthraquinone, at a temperature of 160° to 190° C.

7. The process of manufacturing 2-carboxy-1,2'-dianthrimide which comprises heating substantially one mol of 1-chloro-2-carboxy-anthraquinone with substantially one mol of 2-amino-anthraquinone and substantially 0.6 mol of aluminum chloride in a substantially inert liquid organic reaction medium at a temperature of 170° to 180° C., and recovering 2-carboxy-1,2'-dianthrimide from the resulting reacted mixture.

8. The process of manufacturing 2-carboxy-1,2'-dianthrimide which comprises heating a mixture containing 1-chloro-2-carboxy-anthraquinone, 2-amino-anthraquinone, and about 0.6 mol of aluminum chloride per mol of 1-chloro-2-carboxy-anthraquinone, in ortho-dichlorobenzene as a reaction medium, at a temperature of 170° to 180° C. for at least two hours and recovering 2-carboxy-1,2'-dianthrimide from the resulting reacted mixture.

9. The process of manufacturing 2-carboxy-1,2'-dianthrimide which comprises heating 1-amino-2-carboxy-anthraquinone with 2-chloro-anthraquinone at a temperature above 140° C., but not exceeding 210° C., in admixture with a metal halide condensing agent of the Fridel and Crafts type.

10. The process of manufacturing 2-carboxy-1,2'-dianthrimide which comprises heating 1-amino-2-carboxy-anthraquinone with 2-chloro-anthraquinone at a temperature above 140° C., but not exceeding 210° C., in a reaction mixture containing aluminum chloride as condensing agent.

RICHARD S. WILDER.

REFERENCES CITED

The following references are of record in the file of this patent:

UNITED STATES PATENTS

| Number | Name | Date |
|---|---|---|
| 2,420,022 | Tinker et al. | May 6, 1947 |

FOREIGN PATENTS

| Number | Country | Date |
|---|---|---|
| 561,640 | Germany | Oct. 17, 1932 |

OTHER REFERENCES

Houben, "Das Anthracen und die Anthrachinone" (1929), pages 463–464, also pages 672–676.